Feb. 23, 1937.  F. P. McBERTY  2,071,418
ELECTRIC SEAM WELDER
Filed Nov. 7, 1933  10 Sheets-Sheet 1

Fig.1.

INVENTOR.
FRED. P. McBERTY.
BY
Byrnes, Stebbins, Parmelee & Blenko
ATTORNEYS Feb. 23, 1937. F. P. McBERTY 2,071,418
ELECTRIC SEAM WELDER
Filed Nov. 7, 1933 10 Sheets-Sheet 2

INVENTOR.
FRED. P. McBERTY.
BY
Byrnes, Stebbins, Parmelee & Blenko
ATTORNEYS

Feb. 23, 1937.   F. P. McBERTY   2,071,418
ELECTRIC SEAM WELDER
Filed Nov. 7, 1933   10 Sheets-Sheet 3

INVENTOR.
FRED. P. McBERTY.
BY
Byrnes, Stebbins, Parmelee & Blenko
ATTORNEYS

Feb. 23, 1937. F. P. McBERTY 2,071,418
ELECTRIC SEAM WELDER
Filed Nov. 7, 1933 10 Sheets-Sheet 4

INVENTOR
FRED P. McBERTY
BY
Byrnes, Stebbins, Parmelee & Blenko
ATTORNEYS

Feb. 23, 1937.    F. P. McBERTY    2,071,418
ELECTRIC SEAM WELDER
Filed Nov. 7, 1933    10 Sheets-Sheet 6

INVENTOR.
FRED. P. McBERTY.
BY
ATTORNEYS

Feb. 23, 1937. F. P. McBERTY 2,071,418
ELECTRIC SEAM WELDER
Filed Nov. 7, 1933 10 Sheets-Sheet 9

INVENTOR.
FRED. P. McBERTY.
BY
Byrnes, Stebbins, Parmelee & Blenko
ATTORNEYS

Patented Feb. 23, 1937

2,071,418

UNITED STATES PATENT OFFICE 2,071,418

ELECTRIC SEAM WELDER

Fred P. McBerty, Warren, Ohio

Application November 7, 1933, Serial No. 696,935

2 Claims. (Cl. 219—4)

The present invention relates to electrical seam welders and more particularly to an improved electrical seam welder for long cylinders of corrosion-resistant metal, to the process of seam welding such cylinders and to the product resulting therefrom.

It is an object of the present invention to provide an improved electric seam welder capable of seam welding metallic cylinders of accentuated or excessive length.

It is a further object of the invention to provide a process of seam welding corrosion resistant metals on an industrial scale with a substantially uniform bond or weld of a reliable and strong character.

It is another object of the invention to provide an improved electric welder with a double ended electrical circuit.

It is also within the contemplation of the invention to provide an electrical seam welder having improved features including a welding arm accurately aligned and a clamping device for locking said arm rigidly in position and for permitting quick release of the same.

A further object of the invention is the provision of a movable carriage carrying a welding roll and having associated with it a sliding contact device for the main bus bar.

The invention further contemplates the provision of an air piston for effecting a quick release of the dead weight mounted on the welding roll and carried by the movable carriage.

Another object of the invention is to provide an electric welder having an improved transformer with a regulator capable of giving a multiplicity of adjustments.

It is still a further object of the invention to provide an improved seam welded product and particularly a seam welded cylinder of corrosion resistant metal which is capable of being welded on an industrial scale, with commercial speeds and with a strong and reliable weld.

Other objects and advantages of the invention will become apparent from the following description taken in conjunction with the accompanying drawings in which.

For the purpose of facilitating an understanding of the invention a general description will first be given of the improved electrical seam welder and the improved process of seam welding metals and especially cylinders of accentuated length and made of corrosion resistant metals. Following the general description, the various parts and features of the improved electrical seam welder will be described in detail.

Figure 1:
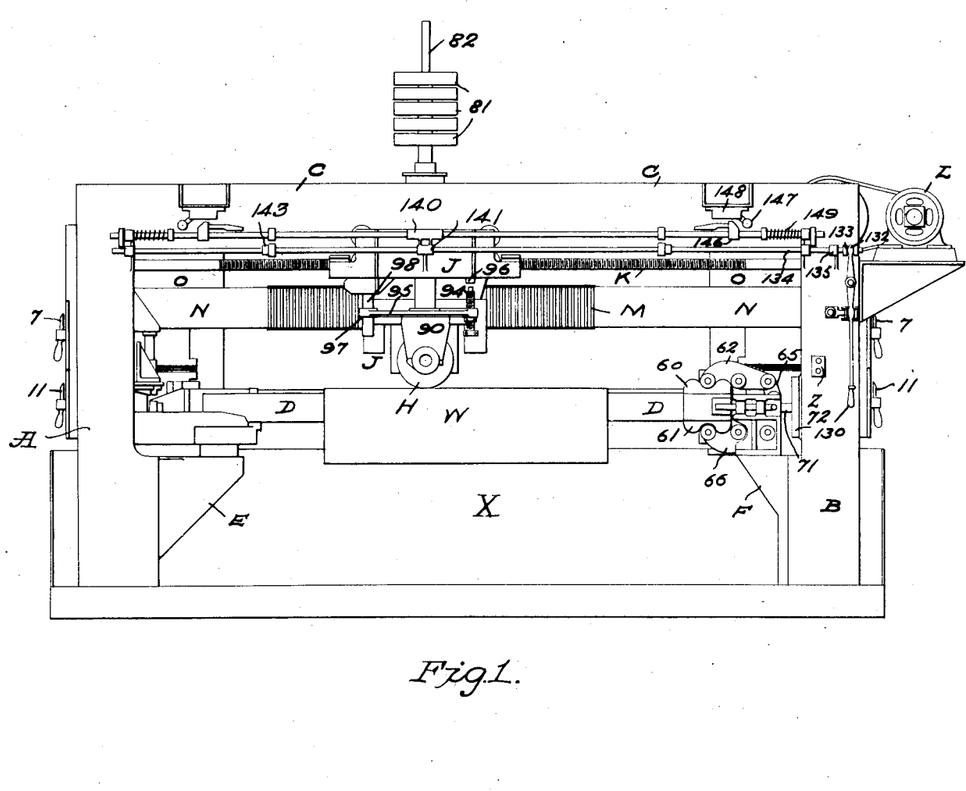
Fig. 1 is a front elevation somewhat schematic and with parts omitted for purposes of clarity, of an electric seam welder embodying my invention.

Referring more particularly to Fig. 1, the improved welder is illustrated with vertical side standards A and B which may be made of any appropriate material. In practice, it is preferred to utilize structural steel which has been welded together. Of course, standard steel structural shapes may be used if desired. Spanning the side standards A and B is a beam C which is preferably constructed of welded steel although any suitable construction may be used.

A welding arm D for carrying the work is pivotally mounted upon bracket E and is adapted to swing outwardly in a horizontal plane to permit the removal of the work. At the right end of the welder a bracket F supports a clamping device G which rigidly locks arm D in the proper position and in perfect alignment for welding.

The clamping device is capable of being operated quickly and readily and its construction and operation will be described in detail hereinafter.

A welding roll H carried by a movable carriage J is adapted to contact with the welding arm D in order to seam weld material which is placed between the arm and the roll. The carriage J is capable of being moved back and forth in any appropriate manner. In the present instance, it is preferred to use a lead screw K which is driven by motor L.

For the purpose of carrying an electric current to welding roll H, a contact device M is provided which is slidably mounted upon the main bus bar N. The main bus bar is connected at each end to a transformer O which supplies the current thereto. The secondary of each transformer is likewise connected to the welding arm D to complete the electrical circuit.

Figures 4, 5:
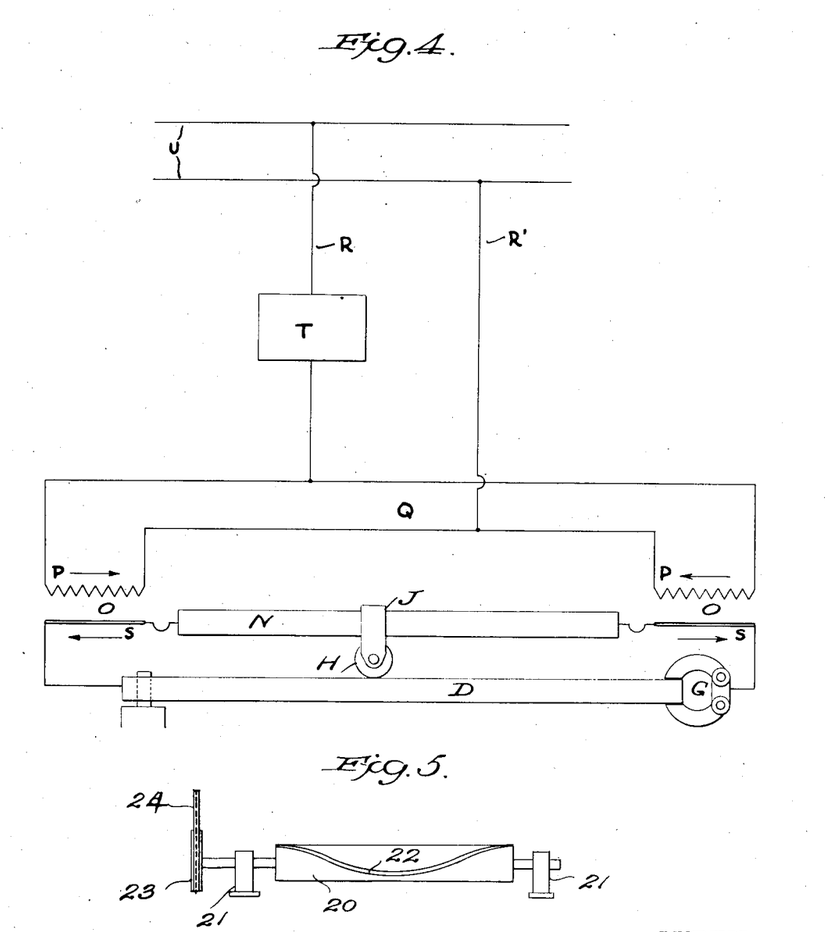
Fig. 4 is a diagrammatic view illustrating the novel electrical circuit utilized in the seam welder.
Fig. 5 illustrates somewhat diagrammatically an auxiliary control for increasing and decreasing the voltage impressed on the transformer shown in the circuit depicted in Fig. 4.

A better understanding of the electrical circuit may be had from Fig. 4. In this figure the welding arm and its associated clamping and locking device G and the main bus bar N together with the movable carriage J carrying welding roll H are diagrammatically indicated. At the left side of the main bus bar and welding arm a transformer O is indicated diagrammatically with the secondary S thereof connected to the left side of the main bus bar and the left side of welding arm D. At the right side of the figure a second transformer O is shown with its secondary S connected to the right side of main bus bar N and locking and clamping device G. In this manner, a complete electrical circuit is established through the secondaries of transformers O.

The primaries P of the transformers are connected to feed lines Q. At an intermediate region of Q, preferably at the middle thereof, connecting lines R and R' are provided to make a connection with main power lines U. In one of the connecting lines an interrupter T is located. In practice, it is preferred to utilize an electrical interrupter. It has been found from practical tests that an electrical interrupter of the type sold on the market under the trade name of "Thyratron" gives satisfactory results. The "Thyratron" system, as those skilled in the art know, contains electron tubes and associated electrical circuit including a transformer which interrupts the current at desired points and controls the current flowing to the welding arm and the roll.

Figure 6:
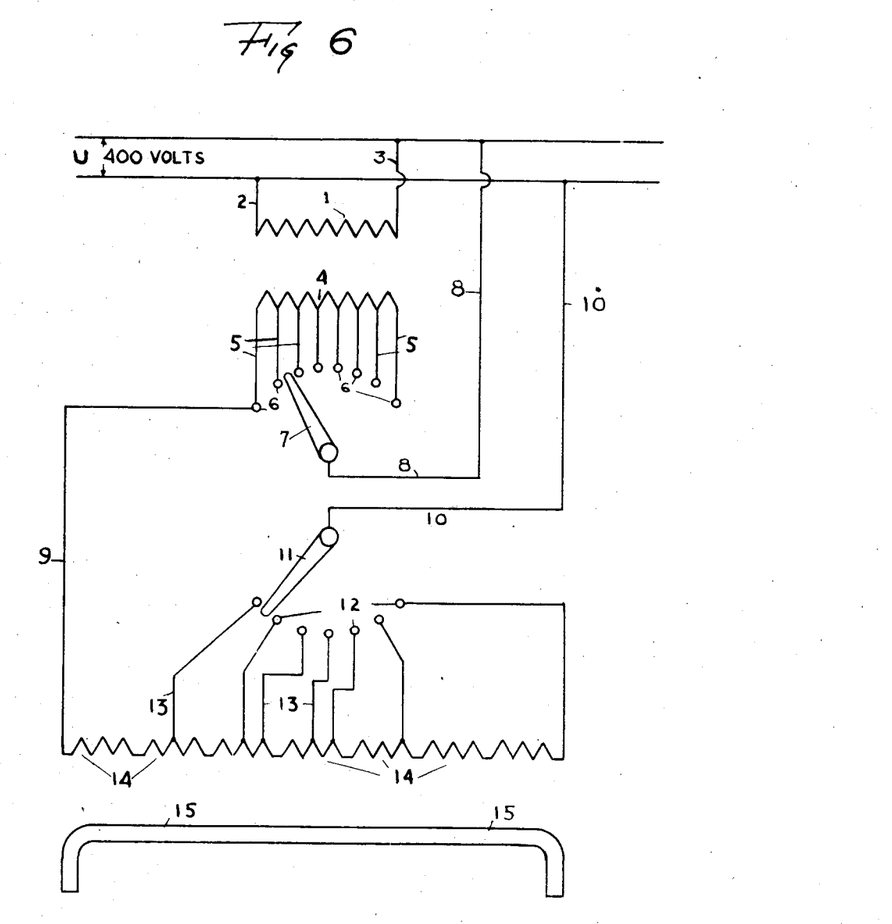
Fig. 6 represents a diagrammatic view of the electric circuit employed in the transformer illustrated schematically in Fig. 4.

In carrying the present invention into practice, it has been found that each transformer O should be made up of a control transformer and a main transformer such as illustrated in Fig. 6. Thus, the main power lines U are connected to the primary 1 of the control transformer by means of connections 2 and 3. The secondary 4 of the control transformer is made of a plurality of turns which are preferably tapped by a plurality of taps 5 which are equi-distant from each other. These taps are connected to contact buttons 6. In the present instance there are 8 taps and 8 contact buttons although any suitable number may be employed.

A contact arm 7 is connected to one of the power lines U by means of connection 8. By adjusting arm 7 on any contact button the desired adjustment and voltage may be obtained. In the present case 440 volts are applied to the main power line U and 8 volts are available on the secondary 4 of the controlled transformer. By having 8 equal taps, it is possible to make adjustments and obtain an increase approximately of one volt for each step.

When arm 7 is moved to the extreme left and engages the contact on the extreme left side of the transformer, a circuit is established via connection 8, line 9 of the main transformer and connection 10 and arm 11 of the main transformer. In this manner, approximately 440 volts are impressed on the primary of the main transformer. In order to vary the voltage available at the secondary of the main transformer a plurality of contacts 12 with associated taps 13 are connected to a plurality of turns 14 wound on the primary of the main transformer. As one skilled in the art readily understands, the voltage impressed upon the primary of the main transformer and the number of turns used determines the voltage available at the secondary 15 of the main transformer. In the present instance, the secondary 15 of the transformer is depicted as one single turn. Of course, the number of turns on the secondary may be varied but it has been found that the most practical and best results have been obtained by the use of a single turn on the secondary.

Figure 7:
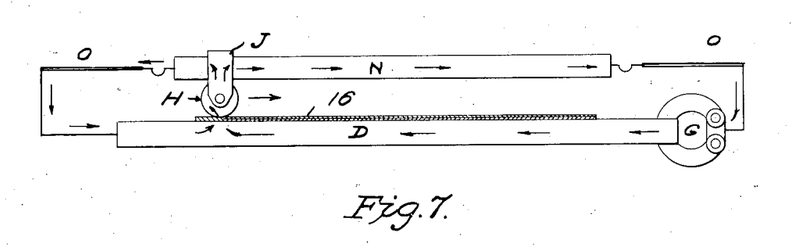
Figs. 7, 8 and 9 show a diagrammatic view of a metal cylinder undergoing welding with the welding roll in different positions.

In the seam welding of metals with the present improved welder embodying the foregoing electrical circuits, lapped sheets 16 are mounted upon welding arm D as will be evident from Fig. 7. In the present instance, the lapped sheets are shown in the form of a cylinder as may be seen from Fig. 1. It is to be noted that the present welder is especially adapted for the welding of cylinders especially of corrosion-resistant metals, of accentuated or excessive length.

When the electric current is turned on it flows through transformers O to the main bus bar and welding arm D. The flow of current from the left transformer is indicated by the arrows which show that electric current flows down to the welding arm and through the lapped metallic sheets at the region where welding roll H makes contact. After passing through the lapped sheets the current passes through welding roll H to the main bus bar N by means of the sliding contact. From the main bus bar N the current returns to the secondary of the left transformer O.

A similar flow of current is established through the secondary of the right transformer. Thus, it will be observed that the current flows through the locking and clamping device G to the right end of welding arm D as indicated by the arrows. The current flows through the lapped metallic sheets to welding roll H at the region where the latter makes contact. The current flows through welding roll H to main bus bar N via the sliding contact M. The flow returns to the right transformer as indicated by the arrows.

By varying the amount of current flowing through the lapped metallic sheets, the pressure applied in the region of contact and the speed of the movable carriage, it has been found possible to seam weld various metals of different gages, especially corrosion-resistant metals. It has been found that practical, satisfactory and successful results may be obtained on an industrial scale by utilizing carriage speeds of approximately 1 foot per minute to approximately 8 feet per minute. With these speeds, pressures from about 100 lbs. to about 1500 lbs. and currents of about 5000 amperes to about 50,000 amperes may be used. As it is apparent to one skilled in the art, the speed is varied by varying the speed of the driving motor L or its associated gears. The pressure can be adjusted by increasing or decreasing the weight mounted on the movable carriage. The electric current can be controlled by placing arm 7 on different contacts 8 and by placing arm 11 on different contacts 12. By utilizing all of the adjustments available in arms 7 and 11, it is possible to obtain 56 different settings. Thus, for each adjustment of arm 7, the voltage impressed upon the primary of the main transformer can be increased from about 440 volts to about 448 volts in steps of about one volt each. The number of turns employed on the primary of the main transformer can be increased from a minimum at the extreme left to a maximum at the extreme right. The particular speed, pressure and current to be used with any given metal and any given gage of thickness can be determined very easily by making a few trials as one skilled in the art will readily understand.

Figure 8:
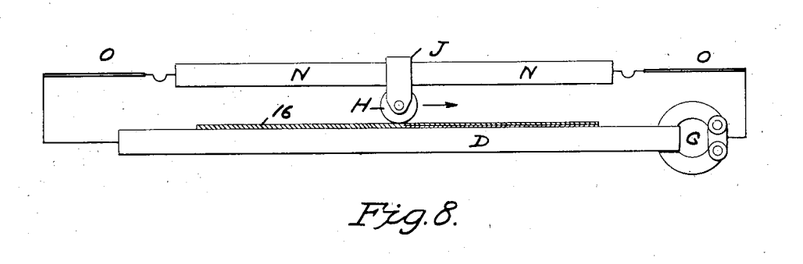
Figure 9:
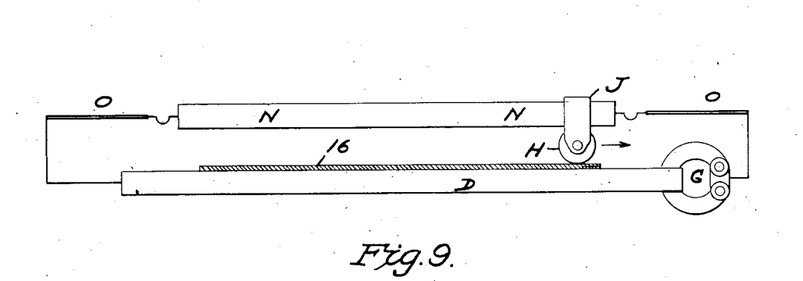

By moving welding roll H in contact and over the lapped sheets from the left side to the right side of the welding arm as indicated by the arrow the lapped sheets are welded together. The flow of electric current to the welding roll and through the lapped sheets is indicated in two positions by Figs. 8 and 9. In Fig. 8 the welding roll is shown in approximately the middle of the welding arm whereas in Fig. 9 the welding roll is shown at the extreme right end of the welding arm. From Figs. 7, 8 and 9, it becomes apparent that the electric current flows from transformers O at each end of the welder to the welding roll. The flow is made up of a right hand stream and a left hand stream of electric current. As the length of the path of the left hand stream increases, the length of the path of the right stream decreases and vice versa. When the roll is at the middle of the welding arm D the path of the two streams is approximately equal. By utilizing the foregoing circuits and process, it is possible to effect satisfactory welding throughout the travel of the welding roll even in cases of accentuated lengths.

When cylinders or the like are being seam welded I sometimes prefer to use an auxiliary voltage control which is illustrated in Fig. 5. It is preferred to mount roll 20 on top of beam C in any suitable manner such as supports 21. A control slot 22 is provided in roll 20. A member mounted upon movable carriage J coacts with slot 22 and causes roll 20 to oscillate in one direction or another. The turning or oscillation of roll 20 actuates a gear 23 and an associated chain 24. This chain actuates any appropriate mechanism for adjusting a regulator controlling the voltage of the current impressed upon the primary of the main transformer. When a motor-generator set is used, the regulating arm controlling the exciting current may be adjusted to increase or decrease the exciting current. By embodying the aforesaid arrangement, it is possible to increase the voltage when the welding roll is at the center of the welding arm and to maintain a more or less constant flow of current through the metal undergoing welding regardless of the position of the welding roll. As one skilled in the art will readily understand, the inductance of the electrical circuit increases as the welding roll moves to the middle of the welding arm when a cylinder of metal is mounted thereon. By increasing the voltage applied to the primary of the main transformer the increase in inductance is overcome and the flow of current is maintained approximately constant.

Figure 10:
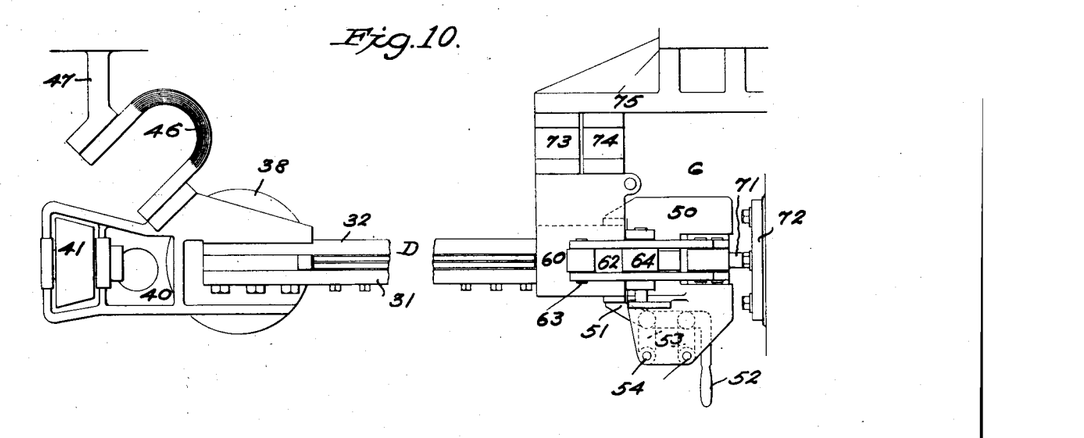
Figs. 10 and 11 depict a top plan view and a detailed front elevation, partly in section, respectively, of the welding arm of the welder and of the clamping device for locking the same in position.
Figure 11:
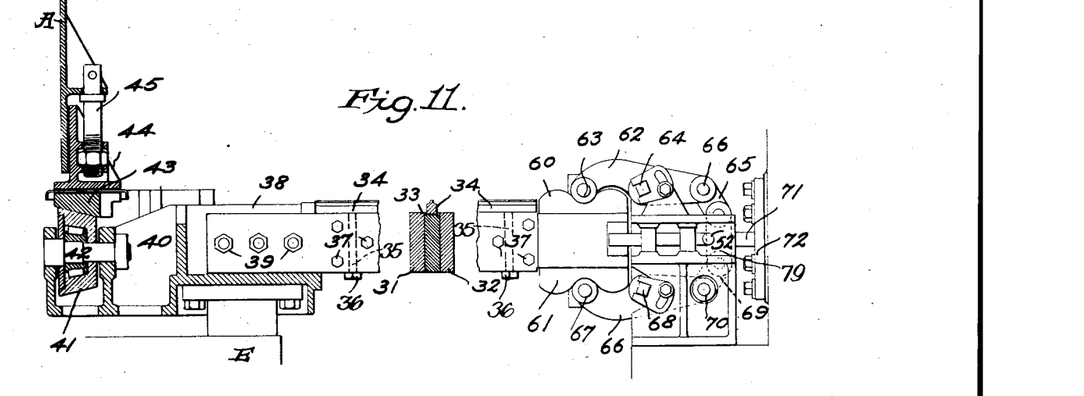

The improved welding arm used in the present welder is illustrated in detail in Figs. 10 and 11. Welding arm D is made of a laminated structure. Side plates 31 and 32 are preferably made of heavy copper. Between the side plates an intermediate plate 33 of approximately the same size is fixed. At the ends of welding arm D and at the middle thereof plates 31, 32 and 33 are joined in electrical contact. Any appropriate means may be employed to secures plates 31, 32 and 33 together but a plurality of bolts 37 may be conveniently used. At all other regions the plates are insulated from each other. With this construction, the proper flow of the current to the welding roll is accomplished. In addition, eddy currents are reduced to a minimum.

Mounted in the top of plate 33 is a contact rod 34. This rod is mounted securely in position and makes a convenient electrical contact with plate 33. The top of contact rod 34 is adapted to make intimate engagement with the metallic sheets or the like which are to be welded. In the event that the top contact surface becomes worn it can be readily dressed. When the contact rod becomes worn out it can be completely replaced with a new contact rod. Any construction may be utilized for holding contact rod 34 in place but it is preferred to utilize bolts 35 which project through plate 33 to the bottom thereof. A nut 36 may be used to fasten the same in position.

Welding arm D is fastened to a mounting 38 by means of a plurality of bolts 39. The mounting is preferably a cast body of copper, bronze or other suitable conductive material. It is preferred to secure mounting 38 pivotally in any suitable manner in bracket E. In practice, the mounting is insulated electrically so that no current flows to the base of the machine through bracket E.

For the purpose of counter-balancing the weight of the welding arm extending from bracket E, a projected shoulder is cast integrally with mounting 38. Carried in shoulder 40 is a guide roller 41 which is in the form of a truncated cone and which has a bearing mounting 42. Guide roller 41 abuts against a fixed plate 43 carried by an adjustable support 44. As may be seen from Fig. 11 support 44 may be raised or lowered by adjusting bolt 45. Contact plate 43 is insulated from bracket 44 to prevent the flow of current to the frame of the welder.

A flexible lead 46 connects mounting 38 with a leg 47 connected to the secondary of the transformer located at the left side of the welder. As is well known flexible lead 46 is made of a plurality of flexible sheets of copper which are soldered or otherwise suitably secured at their ends. The ends are bolted in position although any suitable means of fastening may be used.

The right end of the welding arm D is held in position by the locking and clamping device G. This device is composed essentially of two pairs of clamping jaws, one of the pairs of jaws is to hold the welding arm in its proper lateral position, whereas the other pair of jaws is to hold the welding arm D in its proper vertical position. Although any appropriate construction may be employed it is preferred to utilize the construction shown in Figs. 10 and 11.

In Fig. 10, it will be observed that the rear face of the front end of welding arm D abuts against a fixed jaw 50. This jaw is fastened to bracket F which is secured to standard B. For moving and holding the front face of welding arm D against the fixed jaw 50, a movable jaw 51 is used. For actuating movable jaw 51 a handle 52 is provided.

As may be seen from Fig. 10 the handle is operatively associated with movable jaw 51 and with a pair of legs 53 which are mounted upon a pair of pivots 54. When the handle 52 is moved in one direction the locking device is opened and when it moves in the other direction, it is closed. Of course, fixed jaw 50 and movable jaw 51 are insulated from the base and frame of the welder to prevent current from flowing thereto.

For holding welding arm D in its proper vertical position an upper shoe 60 and a lower shoe 61 are provided to clamp against the top and bottom faces of the free end thereof. Upper shoe 60 is connected to crank 62 by means of pin 63. The crank is pivoted at 64 and has its rear end connected to leg 65 by means of a pin 66. In the same way, the bottom shoe 61 is connected to a crank 66 by means of a pin 67. The crank is pivoted at 68 and has its rear end connected to leg 69 by means of pin 70. The legs 65 and 69 have their rear ends pin connected to a cross connector 79. The cross-connector is operatively associated with a piston rod 71 which projects from a cylinder 72. When the piston rod 71 is moved to the left of the welder by admitting air to cylinder 72, the upper shoe 60 and the lower shoe 61 are clamped against the free end of the welding arm by means of a toggle action thereby securing a safe and effective contact. When the piston rod is moved to the right of the welder the upper shoe 60 and lower shoe 61 are opened. These shoes are insulated from the frame of the machine and consequently electric current cannot flow therethrough.

Figure 12:
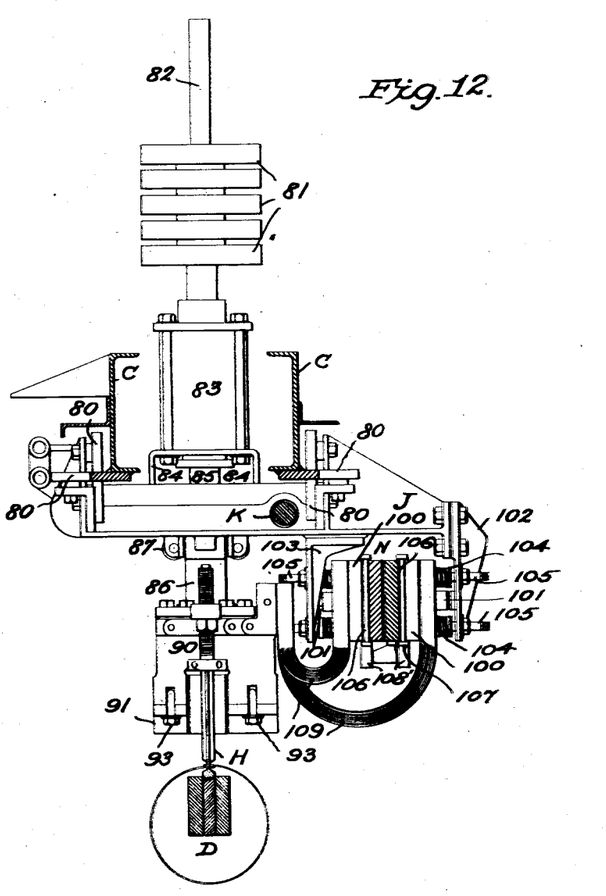
Figs. 12 and 13 illustrate a front elevation, partly fragmentary, and a side elevation, partly in section, respectively, of the movable carriage carrying the welding roll and of the sliding electrical contact and main bus bar.
Figure 13:
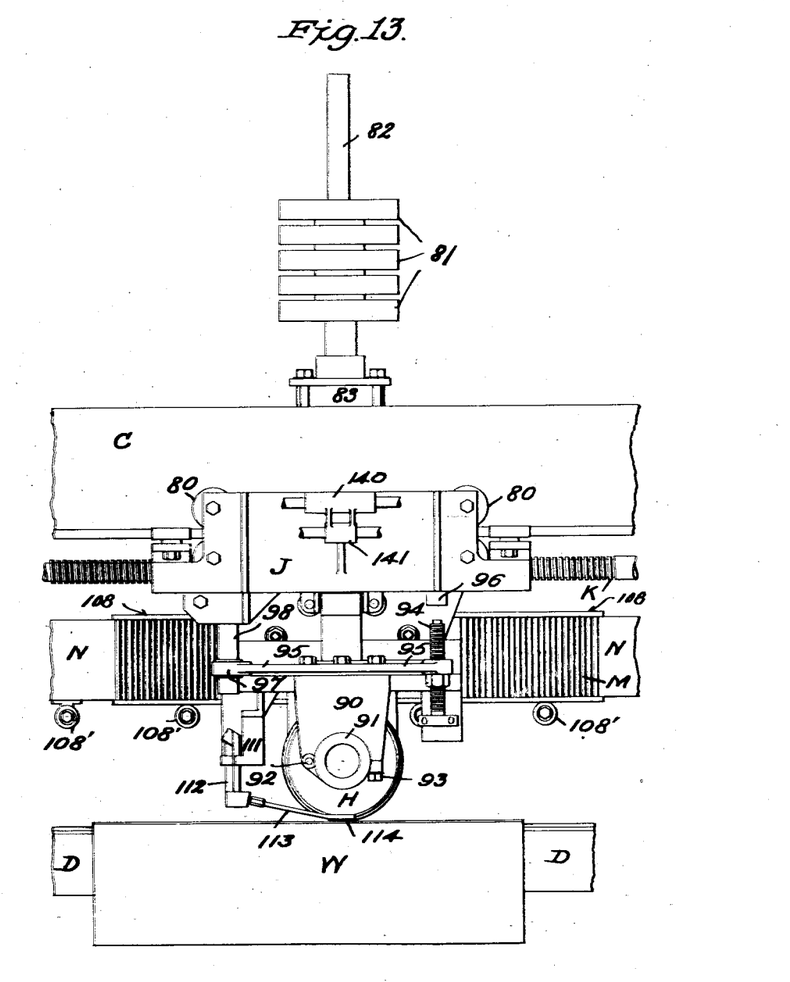

For connecting the secondary of the transformer at the right end of the machine to the upper and lower shoes 60 and 61, a pair of flexible leads 73 and 74 are used. These leads as may be seen from Fig. 10 have their front ends connected to the shoes and the rear ends connected to a fixture 75 associated with the secondary of the right transformer. In Figs. 12 and 13 the movable carriage J carrying welding roller H and sliding contact M may be seen in detail. Referring to Fig. 12, it will be seen that carriage J is carried on beam C by means of a plurality of guide rolls 80. For moving carriage J on guide rolls 80 a lead screw K is arranged to pass through a fixed mounting (not shown) in the interior of the carriage. The fixed mounting may be of any suitable nature but it is preferred to use a nut which is held between a pair of jaws as those skilled in the art will readily understand.

For applying pressure to welding roll H a plurality of weights 81 preferably leaden discs are mounted on a guide rod which is in alignment with welding roll H.

For lifting roll H together with weights 81 upwardly an air cylinder 83 is mounted on top of frame J by means of a support 84. The air cylinder may have any suitable construction and for the purposes of clarity interior details have been omitted. Of course, as one skilled in the art understands the cylinder contains a piston which can be moved in an upward direction by means of air. When it is desired to let the roll come down the air is released from the cylinder and the weights cause the welding roll to descend.

The guide rod 85 projecting from the bottom of air cylinder 83 has connected thereto a square rod which is guided by means of a plurality of rolls 87. These rolls maintain the square rod 86 in its proper position and prevent turning thereof.

The welding roll H is carried in a roll housing 90 which has a cap 91 at the bottom thereof. Cap 91 is hinged at one side by means of a hinge 92 and is fastened at the other side by means of a plurality of hinged bolts 93. With this construction a roll may be taken off and replaced with a new one very easily.

For the purpose of limiting the upward movement of the roll when air is admitted into cylinder 83 an adjustable stop 94 is provided at the right side of a plate 95 fixed above the roll housing. The adjustable stop makes contact at its upper limit with a head 96 fixed to the bottom of carriage J. In order to further insure the proper alignment and movement of roll H an eye 97 is provided at the left side of plate 95 and is adapted to meet with and slide upon guide bar 98 projecting from the lower side of carriage J.

Welding roll H is fed with current from the main bus bar N by means of sliding contact M. This sliding contact comprises a pair of plates 100 which are positioned in the front and in the rear of the main bus bar. These flat sliding contact plates are supported by a pair of pins 101. The pins for the rear plate are secured to a support 102 suspended from the rear of carriage J. The pins for the front plate are secured to a support 103 which is dependent from an intermediate bottom portion of carriage J. Bronze plates 100 are held firmly in position by means of a plurality of steel compression springs 104. The springs are carried on adjustable pins 105. The pins for the rear sliding plate are fixed to support 102 whereas the pins for the front plate are fixed to support 103.

Between the sliding bronze contact plates 100 and the main bus bar N is mounted a movable carriage carrying a plurality of brass rolls 106. These rolls are kept in position by means of a bottom bar 107 and a top bar 108. At spaced intervals a spacer rod passes through the top and bottom support and is riveted or otherwise secured in position. The bottom supports are carried by rollers 108' which project from the underside of the bus bar. A plurality of flexible copper leads 109 connect the sliding contact with carriage J. In practice, the rolls and the sliding contact plates are thoroughly lubricated with graphite grease.

In operating the improved welder particularly with corrosion-resistant metals, it has been found that water must be applied in the form of a wide, strong jet to the welding roll at the point of contact with the sheets to be welded. An accentuated amount of water under pressure must be applied not only to the point of contact between the roll and the metal being welded but also on each side of the welding roll. In carrying this idea into practice, any suitable apparatus may be used but it is preferred to utilize the embodiment shown in Figs. 14 and 15.

Figures 14, 15:
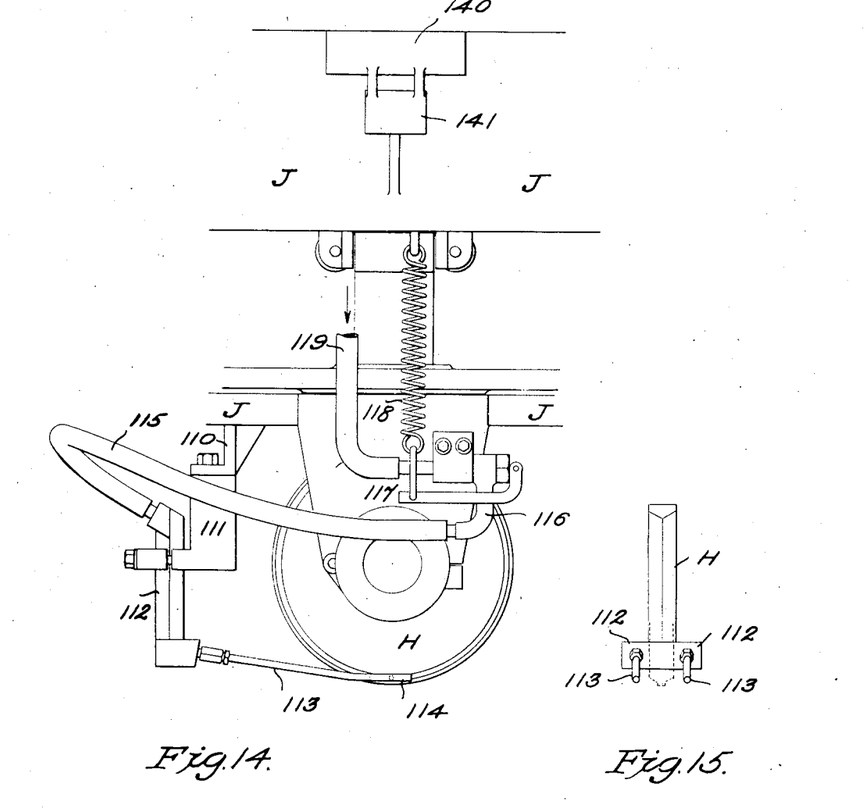
Fig. 14 shows an elevational view, partly fragmentary, of the welding roll and the water nozzles.
Fig. 15 is a side elevation of the welding roll shown in Fig. 12 looking from the left side.

Referring more particularly to Fig. 14, it will be observed that an angular support 110 projects downwardly from carriage J. To this angular support a block 111 is bolted. This block has a nozzle head 112 adjustably bolted thereto. From nozzle head 112 a pair of nozzles 113 projects downwardly on each side of welding roll H. The free ends of nozzles 113 are closed. A short flat orifice 114 is cut in the side of nozzle 113 so as to direct a jet of water against the lower part of roll H and the region adjacent to each side thereof.

For feeding the nozzles a flexible rubber hose 115 is connected to a valve 116. This valve is actuated by an arm 117 connected to a spring 118. Water for the valve 116 is fed by a supply pipe 119. When the roll H is lowered to the work being welded, spring 118 actuates arm 117 which opens valve 116 and permits water to flow through the flexible rubber tube 115 to the orifice in nozzles 113. In this manner, a fool proof device is provided which turns on the water every time welding is to be done.

Figures 16, 17:
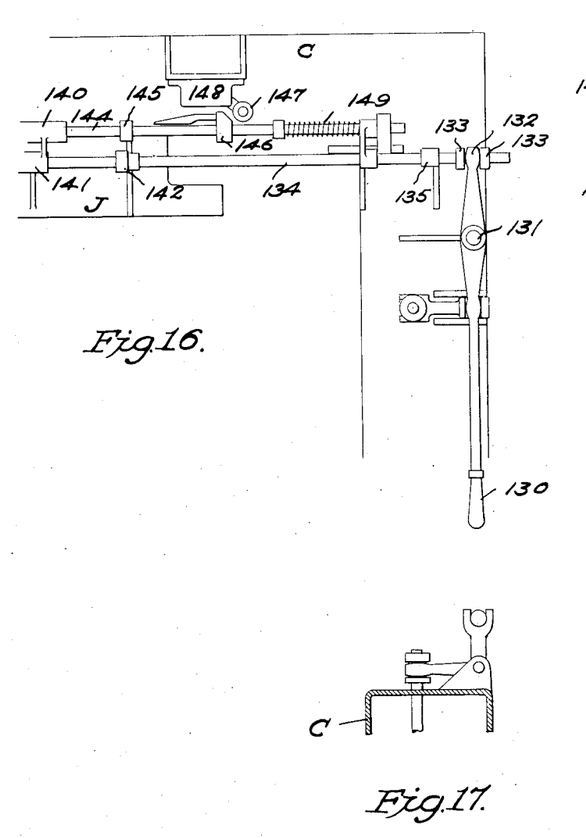
Fig. 16 illustrates a detail front elevational view partly fragmentary, of the electric cut-off switch and of the control handle for operating the clutch associated with the electrical driving motor.
Figs. 17 and 18 are detail views of Fig. 16.
Figure 18:
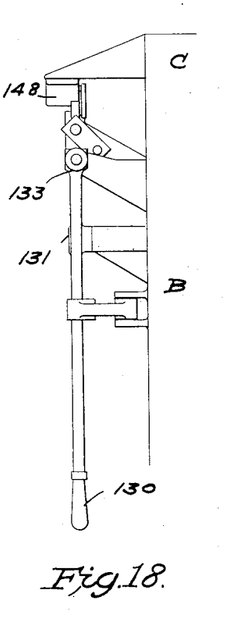

For controlling the movement of carriage J a control handle 130 is mounted on standard B at the right side of the welder. This handle controls a clutch mechanism (not shown) which is interposed between a connection on the right end of lead screw K and gear associated with the driving motor L. As one skilled in the art fully understands the construction of the clutch and gear mechanism a detailed description and illustration will not be given because such clutch and gear mechanism is not considered a part of the present invention and because such details may interfere with the clarity of the drawings.

Handle 130 is pivoted on a pin 131. The upper end 132 is held between a pair of collars 133 carried by a rod 134 which passes through a support 135.

When the welder is operating carriage J has a pair of superimposed collars 140 and 141. A stop 142 is mounted upon rod 134 and is intended to react with collar 141 when the carriage has reached the extreme limit at the right end of the welder. As soon as collar 141 contacts with stop 142, rod 134 is moved towards the right and actuates the control handle 130 to cause the clutch to operate and disconnect the driving gears from the lead screw. In this manner, there is a positive device mounted upon the welder which prevents the carriage from moving beyond a certain limit. At the left side of the machine a stop 143 is provided which functions in the same manner when collar 141 contacts therewith.

In addition to the mechanical cut-off device an electrical cut-off device is provided on the welder. In Fig. 16, it will be observed that collar 140 surrounds a rod 144. Adjacent to the right end of rod 144 is a stop 145 which is adapted to make contact with collar 140 and cause a cam block 146 to engage a roller 147 which actuates a switch 148. This switch is in a shunt relay circuit which causes the supply of current flowing to the welder to be disconnected. After the cut-off has functioned spring 149 returns rod 144 to its normal position.

The operation of the improved welder is obvious to those skilled in the art but a short description will nevertheless be given. Thus, for instance, a metallic cylinder W is mounted upon welding arm D when the latter is in its forward and open position. Welding arm D is then moved backward until it comes against the rear element of the clamping and locking device. The lateral clamps are closed mechanically by operating handle 52. The air is then turned on in cylinder 72 and rod 71 is moved to close copper or bronze shoes 60 and 61 against the top and the bottom of welding arm D. The welding roll is then brought into contact with the cylinder W at one end thereof by releasing the air from cylinder 83. The control handle 130 is moved to throw in the clutch and to cause the movement of carriage J. The current is then turned on by means of switch Z and welding begins. Thus the carriage J may move from the extreme left as shown in Fig. 7 through the stage shown in Fig. 8 and to the extreme right end shown in Fig. 9. When the carriage has reached the end of its travel the machine may be turned off manually or the automatic cut-off may be actuated by collars 140 and 141. The welding roll H is then raised by introducing air into cylinder 83 and the locking and clamping device is opened by means of the mechanical handle 52 and by means of introducing air into cylinder 72. The welding arm D may be swung forwardly of the machine and the welded cylinder removed therefrom.

Figure 2:
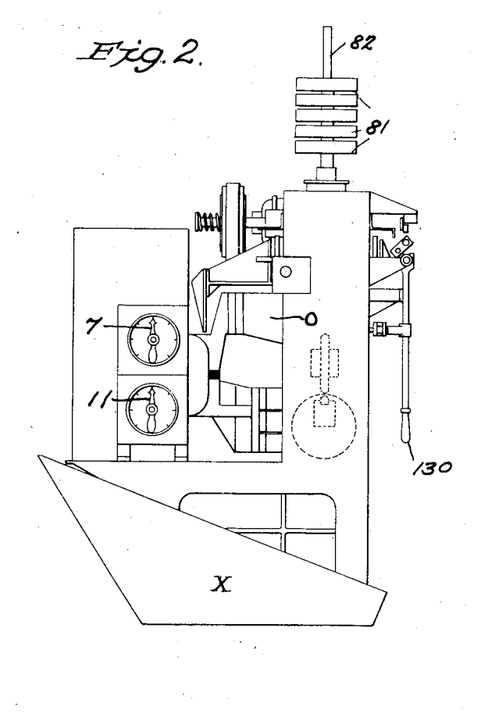
Figs. 2 and 3 are side elevations of the seam welder shown in Fig. 1.
Figure 3:
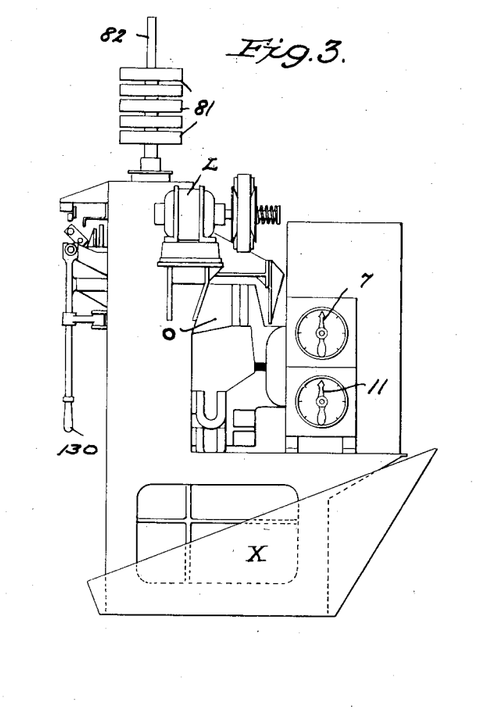

In the improved welder water cooling may be employed as those skilled in the art readily understand. Thus, the conventional water cooling may be applied to welding arm D, welding roll H and especially the shaft thereof, main bus bar N, the various parts of the transformers and other desired parts of the welder. The waste water from the cooling circuits may be discharged to a sewer or may be discharged into a pan X underneath the welder which is shown in Figs. 1, 2 and 3. In addition, to the conventional water cooling, special water cooling is applied to welding roll H by means of nozzles 113. These nozzles eject a stream of water from a narrow short orifice against the region where the welding roll makes contact with the metal sheets undergoing welding and in the region ahead of the welded roll and in the region in the rear of the welding roll. In this manner, an excess amount of water is applied under considerable pressure to both sides of the welding roll and overheating and failure to weld are prevented.

The present improved welder and process of seam welding can be applied to any appropriate metals or alloys but is especially adapted for seam welding corrosion-resistant metals. In particular, corrosion resistant metals containing nickel can be seam welded satisfactorily. As a result of extensive tests it has been found that a nickel copper alloy especially one in which the major portion thereof consists of nickel can be seam welded in thin gages on an industrial scale in a practical, satisfactory and economical manner. Thus, a nickel-copper alloy sold on the market under the trade-mark Monel metal can be welded with great facility by the use of the present improved welder and the process of seam welding.

I claim:

1. An electrical welding machine for seam welding which comprises a frame, a laminated welding arm pivotally mounted at one end in said frame for carrying a work piece to be seam welded, a readily replaceable contact rod mounted on the top surface of said welding arm, two pairs of jaws for holding the other end of said welding arm in the proper horizontal and vertical position respectively, manually and pneumatically operative elements for opening and closing said jaws, a welding roll adapted to move over said work piece under pressure, a movable carriage carrying said welding roll, a fixed bus bar, a contact device for conducting electricity from said bus bar to said welding roll, and a pair of welding current sources for supplying electricity to said welding roll from both ends of said bus bar and said welding arm, each of said sources including a control transformer having a tapped secondary and a main transformer having a tapped primary connected to the secondary of said control transformer whereby operating voltage and turn ratio of said main transformer and the welding current output may be accurately adjusted.

2. An electrical welding machine for seam welding which comprises a frame, a laminated welding arm pivotally mounted at one end in said frame for carrying a work piece to be seam welded, a readily replaceable contact rod mounted on the top surface of said welding arm, a fixed jaw and a manually operative movable jaw for holding the other end of said welding arm in the proper horizontal position, an upper shoe and a lower shoe for holding said welding arm in the proper vertical position, pneumatically operative elements for opening and closing said shoes, a welding roll adapted to move over said work piece under pressure, a movable carriage carrying said welding roll, a fixed bus bar, a contact device for conducting electricity from said bus bar to said welding roll, and a pair of welding current sources for supplying electricity to said welding roll from both ends of said bus bar and said welding arm, each of said sources including a control transformer having a tapped secondary and a main transformer having a tapped primary connected to the secondary of said control transformer whereby operating voltage and turn ratio of said main transformer and the welding current output may be accurately adjusted.

FRED P. McBERTY.